F. M. HOLMES.
ELECTRIC BATTERY.
APPLICATION FILED JUNE 19, 1922.

1,433,136.

Patented Oct. 24, 1922.

Inventor
Frank M. Holmes

By B. P. Fishburn
Attorney

Patented Oct. 24, 1922.

1,433,136

UNITED STATES PATENT OFFICE.

FRANK M. HOLMES, OF WICHITA FALLS, TEXAS, ASSIGNOR OF ONE-THIRD TO W. L. VALENTINE AND ONE-THIRD TO G. D. RIGSBY, BOTH OF WICHITA FALLS, TEXAS.

ELECTRIC BATTERY.

Application filed June 19, 1922. Serial No. 569,470.

*To all whom it may concern:*

Be it known that I, FRANK M. HOLMES, citizen of the United States, residing at Wichita Falls, in the county of Wichita and State of Texas, have invented certain new and useful Improvements in Electric Batteries, of which the following is a specification.

My invention relates to improvements in electric batteries, primary and secondary.

An important object of the invention is to provide a composition for use in connection with the positive and negative elements of a battery, which composition is relatively dry, dispensing with the ordinary liquid electrolyte, employed in secondary batteries, and the electrolyte of primary batteries, which composition will operate for a considerable length of time without the addition of water.

A further object of the invention is to provide a composition of the above mentioned character, having a high efficiency, and long life.

A further object of the invention is to provide a composition of the above mentioned character, which is not affected or injured by low temperature, such as a freezing temperature.

Other objects and advantages of the invention will be apparent during the course of the following description.

It is to be understood that I contemplate embodying my invention in any type of primary or secondary battery, but simply for the purpose of illustration, I will fully describe the invention, as embodied in a secondary battery, while of course the invention is in no sense restricted to this embodiment.

Figure 1:
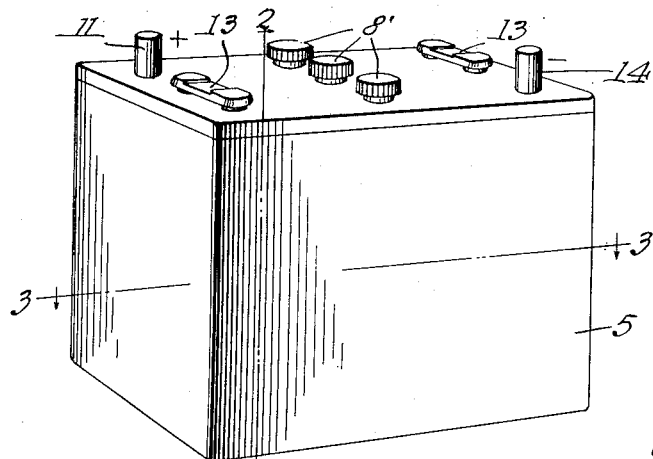
Figure 3:
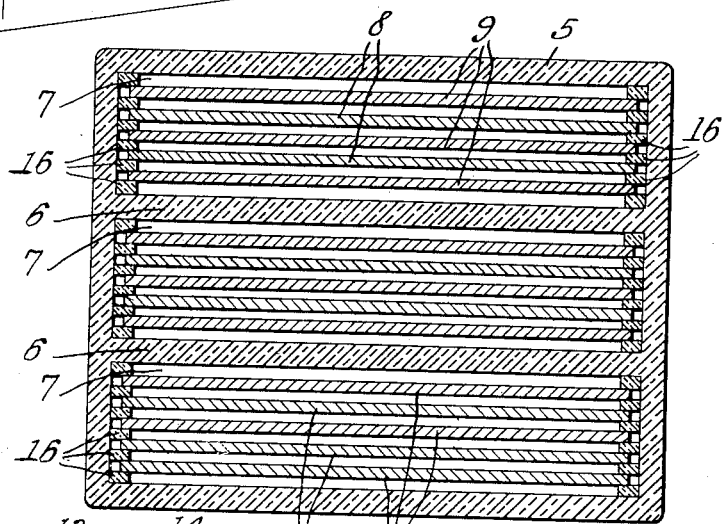
Figure 2:
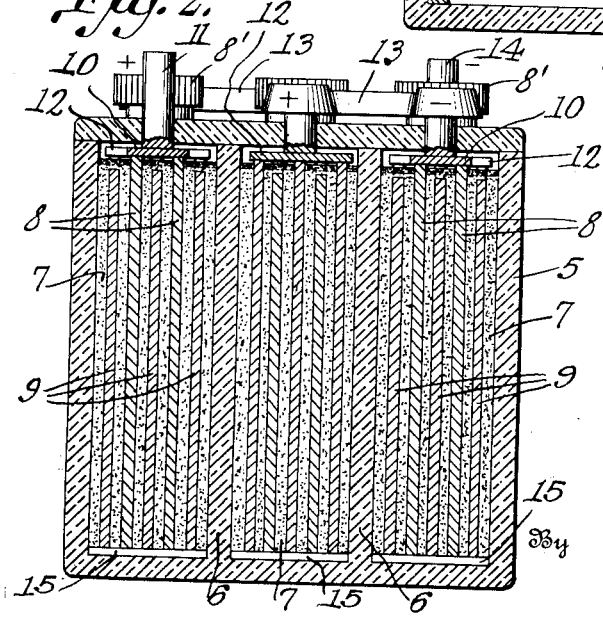

In the accompanying drawings forming a part of this specification and in which like numerals are employed to designate like parts throughout the same, Fig. 1 is a perspective view of a battery embodying my invention, Fig. 2 is a transverse section taken on line 2—2 of Fig. 1, and Fig. 3 is a horizontal section taken on line 3—3 of Fig. 1.

In the drawings, wherein for the purpose of illustration is shown a preferred embodiment of my invention, the numeral 5 designates a casing for the storage battery which may be of any well known or preferred material, such as hard rubber. This casing as shown is provided with partitions 6, which separate the same into a plurality of cells 7, which are separate from each other. The invention of course is not restricted to the number of cells, as these may be varied, as may be found advantageous.

In each cell 7, I preferably arrange two positive elements or plates 8, and the numeral 9 designates negative elements or plates. The negative elements are arranged upon the outer sides of the positive elements and between them, as shown. The positive plates are connected at their tops by a strap 10, having connection with a terminal 11, constituting the positive terminal of the battery. The negative plates or elements 9 are connected by straps 12, at the opposite end of the cell. The negative plates in the first cell to the left are connected in series with the positive plates in the intermediate cells, by means of a strap 13, while the negative plates in the intermediate cell are connected in series to the positive plates in the cell to the right by means of a strap 13. The negative plates in the cell 17 to the right have their strap 12 connected with a terminal 14, which is the negative terminal of the battery. It is thus seen that the several sets of plates in the battery are connected in series, as is well known.

In each cell 7, at the bottom, are upstanding ribs 15, serving to support the positive and negative plates, when they are introduced into the cell. In order that these plates may be held in spaced relation, prior to the spaces between them being filled with my composition, to be described, I provide spacing strips 16, arranged between them at their edges. The ribs 15 and the strips 16 are preferably formed of rubber.

The elements or plates 8 and 9, in the illustration of a secondary battery, may be of the usual lead grid type carrying the active material or paste, usually lead oxide. As I have heretofore stated, I contemplate applying the invention to primary as well as secondary batteries, and in a primary cell, the usual positive and negative elements of the primary battery would be employed, such as zinc and copper.

In producing the composition for filling my battery, I employ preferably one part by weight of a mass consisting of silica flour, which is silica oxide ground to an impalpable powder. The form of silica oxide which I preferably employ is quartz, or rock crystal or pure crystallized silicon oxide, ($SiO_2$).

With this one part by weight of the first named mass of silica flour I add one part by weight of a mass containing a mixture of calcium sulphate and phosphoric acid. This mixture is obtained by treating bone meal with 1300 specific gravity sulphuric acid, whereby calcium sulphate ($CaSo_4$) and phosphoric acid ($H_3Po_4$) are obtained. I next remove as far as possible, all traces of the uncombined sulphuric acid. This is accomplished by letting the mass settle, with the calcium sulphate and phosphoric acid or precipitates at the bottom, and pouring or drawing off the acid solution from the top of the mass. Further water is added, and after settling the acid solution is again withdrawn. This may be repeated a number of times, and when practically all traces of the acid have been removed, the precipitate is spread out on a flat surface, and will become thoroughly dry. It is this mass containing dry calcium sulphate and phosphoric acid, obtained as above explained, which is added in an equal part by weight, with the first named mass of silica flour, above described.

I next add an equal part by weight of a mass containing lead sulphate. This material is produced by treating dry white lead, lead carbonate ($PbCO_3$) with 1300 specific gravity sulphuric acid. As a result of this treatment, 75% of lead sulphate and 25% hydrated lead oxide are obtained. The mixture is allowed to settle, the precipitate containing the lead sulphate and the hydrated lead oxide settling to the bottom. The excess acid in the top of the mass is withdrawn, and water added, and the mass again allowed to settle, and the acid solution at the top withdrawn. This operation may be continued a number of times until practically all traces of the acid are removed. The precipitate is then spread on a flat surface and dried. This dried mass, is added to the other masses, in an equal part by weight, with respect to each mass.

I also provide an equal part by weight with respect to each mass of an inert filler, such as inert earth, such as fuller's earth, kieselguhr, or the like.

These four masses, in equal proportions by weight, as above stated, in the dry form, are now thoroughly mixed and the resultant mass is introduced into the cells 7. I preferably introduce some of this mass into the cell 7 prior to the introduction therein of the plates, and add a sufficient amount to fill the lower portion of the cell, up to the top of the supporting ribs 15. The elements or plates 8 and 9 are next introduced into the cell and this dry powdered mass introduced into the cell upon opposite sides, about and between the plates and the walls of the cell, to completely fill all of the spaces surrounding the plates. The dry mass is preferably tamped or slightly packed so that all spaces will be filled. I now add to this dry mass 1300 specific gravity sulphuric acid, and add as much acid to the dry mass as it will absorb, but as soon as the absorption point is reached, the acid is stopped.

After thus applying the acid, I take some of my dry composition, and add thereto an equal amount of plaster Paris, and mix the same into a liquid by adding distilled water. This liquid is now poured on top of the plates and composition therebetween, and upon drying produces a hard covering or coating. The top of the casing 5 is now placed in position and sealed to the casing. The top or cap 7 of the casing is provided with an opening which may be equipped with a detachable vent cap 8', to permit of the escape of moisture, and the addition of water to the composition within the cell, if necessary.

The battery thus produced may be charged and discharged in the usual manner. I have found that a battery of this type will operate for a long period, such as a year or more, without the addition of water and without any terminal traces of corrosion, and also reducing the escape of gas to the least possible minimum.

It is to be understood that the form of my invention herewith shown and described is to be taken as a preferred example of the same, and that various changes in the size, shape, and arrangement of parts may be resorted to without departing from the spirit of my invention or the scope of the subjoined claims.

Having thus described my invention, I claim:

1. An electric battery, comprising a casing, positive and negative plates within the casing, and a composition surrounding the plates within the casing, said composition including silica flour, a mass including calcium sulphate and phosphoric acid, a mass including lead sulphate and hydrated lead oxide, an inert absorbent finely divided mineral material, and sulphuric acid.

2. An electric battery, comprising positive and negative elements, and a composition held in contact with said elements, said composition including silica flour, a finely divided mass including calcium sulphate and phosphoric acid, a finely divided mass including lead sulphate, an inert absorbent earth, and an acid absorbed in said composition.

3. An electric battery, comprising positive and negative elements, and a composition held in contact with said elements, said composition comprising finely divided crystallized silicon oxide, a mass including finely divided calcium sulphate and phosphoric acid, a mass including finely divided lead sulphate and hydrated lead oxide, said silicon oxide, and the first and second named mass being present in substantially equal amounts by weight, and an acid absorbed in such composition.

4. The hereindescribed method of producing a composition for use in connection with the positive and negative elements of an electric battery, which consists in subjecting bone meal to the action of sulphuric acid to produce lime sulphate and phosphoric acid, separating out substantially all traces of the uncombined sulphuric acid, causing the resulting product to be dried in a finely divided state, subjecting lead carbonate to the action of sulphuric acid for producing lead sulphate and hydrated lead oxide, separating out substantially all traces of the uncombined acid, causing the product to be thoroughly dried in a finely divided state, combining the two products thus obtained with silica flour and a finely divided absorbent earth filler and thoroughly mixing the same, and adding as acid to the mass until the point of absorption is substantially reached.

In testimony whereof I affix my signature.

FRANK M. HOLMES.